United States Patent
Taniuchi et al.

(10) Patent No.: US 6,663,270 B2
(45) Date of Patent: Dec. 16, 2003

(54) VEHICLE LAMP

(75) Inventors: Hitoshi Taniuchi, Yamanashi-ken (JP); Kouichi Nagano, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 10/226,245

(22) Filed: Aug. 23, 2002

(65) Prior Publication Data
US 2003/0090908 A1 May 15, 2003

(30) Foreign Application Priority Data
Aug. 24, 2001 (JP) ........................................ 2001-254681

(51) Int. Cl.$^7$ ................................................. B60Q 1/06
(52) U.S. Cl. ...................... 362/514; 362/512; 362/513; 362/465; 362/466
(58) Field of Search ................................ 362/539, 277, 362/284, 324, 512, 514, 513, 282, 322, 464, 465, 466, 37

(56) References Cited

U.S. PATENT DOCUMENTS

| | | | |
|---|---|---|---|
| 4,875,141 A | 10/1989 | Miyauchi et al. ............. 362/61 |
| 5,060,120 A * | 10/1991 | Kobayashi et al. ......... 362/465 |
| 6,059,435 A * | 5/2000 | Hamm et al. ................ 362/514 |
| 6,457,849 B2 * | 10/2002 | Tsukamoto ................... 362/509 |
| 6,543,910 B2 * | 4/2003 | Taniuchi et al. ............. 362/297 |
| 6,575,609 B2 * | 6/2003 | Taniuchi et al. ............. 362/517 |
| 2002/0071266 A1 * | 6/2002 | Taniuchi ...................... 362/514 |

FOREIGN PATENT DOCUMENTS

JP  2000-215717  8/2000

* cited by examiner

Primary Examiner—Thomas M. Sember
(74) Attorney, Agent, or Firm—Morgan, Lewis & Bockius LLP

(57) ABSTRACT

A vehicle lamp mounted on a vehicle body which can lean to one side at the time of turning, i.e., going around a curve, moving circularly, or the like. The lamp can include a first ellipse group reflecting surface having a movable part and an opening part, and a second ellipse group reflecting surface corresponding to an area covering a moving range of the opening part. The movable part of the first ellipse group reflecting surface can move by a drive unit to form a main light distribution that is kept in a substantially horizontal position. Light rays that pass through the opening part reach the second ellipse group reflecting surface and are reflected and illuminate an area ahead of the vehicle body when it leans to one side.

41 Claims, 9 Drawing Sheets

VEHICLE LAMP

This invention claims priority benefit to Japanese Patent Applications No. 2001-254681, filed on Aug. 24, 2001, the disclosure of which is hereby incorporated by reference.

BACKGROUND OF THE INVENTION

1. Field of the Invention

The present invention relates to a vehicle lamp, and more particularly, relates to a vehicle headlight adapted to be equipped in vehicles such as two-wheeled vehicles and some three-wheeled and multi-wheeled vehicles which can lean to one side at the time of turning around, i.e., going around a curve, moving circularly, or the like.

2. Description of the Related Art

FIG. 1 shows a projection-type headlight 90 as an exemplified configuration of a conventional headlight. The headlight 90 includes a light source 91, an ellipse group reflecting surface 92 such as a rotated elliptic surface having a first focus f1 located at the light source 91, a shutter 93 arranged in the vicinity of a second focus f2 of the reflecting surface 92, and a projection lens 94.

The shutter 93 is provided in luminous flux, which is in a generally circular shape in its cross section and converges from the reflecting surface 92 to the second focus f2. The shutter 93 is able to block a lower half part of the luminous flux in section to obtain the reflecting light in the shape of a generally upper chord semicircle in section. The luminous flux traveling from the reflecting surface 92 is flipped vertically and horizontally after converging to the second focus f2, so that the semicircular upper chord part of the reflecting light can be projected as a semicircular lower chord part thereof through the projection lens 94 in the illumination direction. Consequently, the light illuminated from the headlight 90 does not include light rays traveling upward, resulting in a "passing-by mode" light distribution pattern (i.e., a low beam) S which is substantially rectangular, and long in a horizontal direction as shown in FIG. 2.

A two-wheeled vehicle leans to the left side at the time of going around a left curve. As shown in FIG. 3, the low beam distribution pattern S leans to the left downside with respect to a horizontal axis H on a screen because the headlight 90 is fixed on the vehicle body. In other words, there is a problem in which the headlight cannot sufficiently illuminate the left forward area ahead of the vehicle in the traveling direction. Similarly, such a problem may be caused in a three-wheeled vehicle, multi-wheeled vehicles or in vehicles in which a driver's seat leans to one side at the time of going around a curve.

For solving at least the above problems, there is proposed a method for always preventing the low beam distribution pattern S from being leaned to one side with respect to the surface of earth by having an entire set of the headlight 90 turned around its center axis. However, the turning movement of the two-wheeled vehicle varies depending on its driving conditions. For example, when the two-wheeled vehicle runs at a comparatively high speed, it is able to turn around as the vehicle body leans to one side without substantially using a handle bar. On the other hand, when it runs at a low speed, the handle bar must be used for steering to the desired side to turn around. In the great majority of actual driving cases, the vehicle turns while running at a high speed. Therefore, the turning of headlight in synchronization with the handle operation is not necessarily required for satisfying all of the conditions for the turning of the vehicle. In fact, it cannot be a complete measure to improve the problem.

SUMMARY OF THE INVENTION

For solving the above problems, one aspect of the present invention is to provide a vehicle lamp capable of obtaining a desired light distribution pattern in a desired direction for a two-wheel vehicle, multi-wheeled vehicle, or a vehicle having a vehicle body which leans to one side at the time of turning. In addition, another aspect of the present invention is to provide a vehicle lamp capable of keeping a horizontal line or curve of the desired light distribution pattern substantially parallel or in a set position relative to the surface of earth or other driving surface.

According to an embodiment of the present invention, as concrete means for solving the above problems, a vehicle lamp mounted on a vehicle body can have the following features. That is, the vehicle lamp can include: a light source; a projection lens; a first ellipse group reflecting surface having a movable part provided at at least one portion thereof, the first ellipse group reflecting surface having a first focus located approximately at a position of the light source, the first ellipse group reflecting surface being configured such that light rays traveling from the first ellipse group reflecting surface is adjusted to enter in the projection lens, said movable part preferably having at least one opening part; a second ellipse group reflecting surface corresponding to an area covering a moving range of the opening part formed or installed in the movable part of the first ellipse group reflecting surface, said second ellipse group reflecting surface having a first focus located approximately at the light source, the second ellipse group reflecting surface being configured such that light rays traveling from the second ellipse group reflecting surface are adjusted to enter in the projection lens; a drive unit connected with the movable part of the first ellipse group reflecting surface; and a fixing member arranged such that the movable part of the first ellipse group reflecting surface is interposed between the fixing member and the second ellipse group reflecting surface, the fixing member retaining the movable part of the first ellipse group reflecting surface in place.

In this constitution, a shape of light distribution formed by light rays from the projection lens can be substantially rectangular having a long side extending in a horizontal direction, and the movable part of the first ellipse group reflecting surface turns by actuating the drive unit such that the long side of the shape of the light distribution is kept in a substantially horizontal position with respect to a surface of earth or in a position that facilitates illumination in the turning direction. Furthermore, light rays that pass through the opening part of the first ellipse group reflecting surface can reflect from at least a part of the second ellipse group reflecting surface, and then converge to a point in a predetermined direction to illuminate an area ahead of the vehicle body.

Conventionally, as described above, the vehicle headlight leans to one side when the vehicle turns about, so that a light distribution pattern also leans to the same side. The present invention can solve this and other problems by providing, as shown in one embodiment of the invention, a vehicle headlight in which a generally rectangular light distribution pattern can be substantially parallel with the surface of earth (i.e., the surface of road) by turning the movable part. In addition, a shutter part can be integrally provided which works together with the movable part, so that a desired light distribution pattern in a desired direction is obtained. Furthermore, using the relative movements of an opening of the first ellipse group reflecting surface and the position of the second ellipse group reflecting surface, the luminous flux can be biased in the tuning direction for further improving visibility. Therefore, this embodiment of the vehicle headlight produces an excellent effect on performance improvement of the vehicle lamp.

An embodiment of the vehicle headlight according to the present invention can include a shutter part which is capable of working together with the movable part of the first ellipse group reflecting surface. In this constitution, it is preferred that the movable part of the first ellipse group reflecting surface turn around by actuating the drive unit such that an upper end of the shutter part is kept in a horizontal position with respect to the surface of earth.

In a vehicle headlight according to the invention, it is preferred (but not necessary) that the movable part and the shutter part of the first ellipse group reflecting surface be integrally formed. The light rays that pass through the opening part and reflect on the second ellipse group reflecting surface can illuminate a forward area in a traveling direction when the vehicle body leans to one side. A second focus of the second ellipse group reflecting surface may preferably be located in the vicinity of a focus of the projection lens. It is also preferable for the first ellipse group reflecting surface to have a fixing part, and a portion of the second ellipse group reflecting surface for covering the opening part may be connected with the fixing part of the first ellipse group reflecting surface through a stepped portion. The first ellipse group reflecting surface may have a fixing part behind the movable part, and it is preferable that the fixing part and the movable part of the first ellipse group reflecting surface can function as a continuous surface.

In a vehicle headlight according to the invention, the first ellipse group reflecting surface may be preferably located inside the second ellipse group reflecting surface. Turning of the first ellipse group reflecting surface can be performed by the drive unit based on an output of a sensor for detecting inclination of the vehicle body, an output of a sensor for detecting a running speed of the vehicle body, or an output of a sensor for detecting a steering angle of a steering wheel or a handle bar. It is preferred that the drive unit include a motor and a gear mechanism, but can also include a magnetic, fluid, gravity or other type of drive unit as well.

BRIEF DESCRIPTION OF THE DRAWINGS

These and other objects and advantages of the present invention will become clear from the following description with reference to the accompanying drawings, wherein.

DETAILED DESCRIPTION OF PREFERRED EMBODIMENTS

Figure 4:
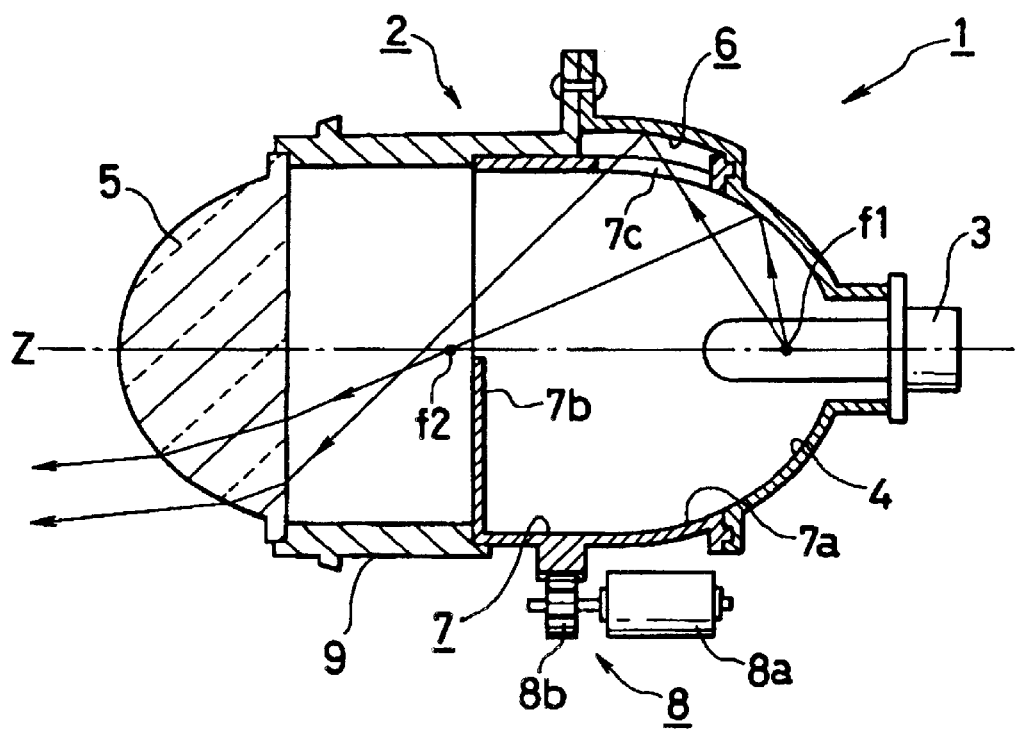
FIG. 4 is a cross sectional view illustrating a preferred embodiment of a vehicle headlight made in accordance with the principles of the present invention.
Figure 5:
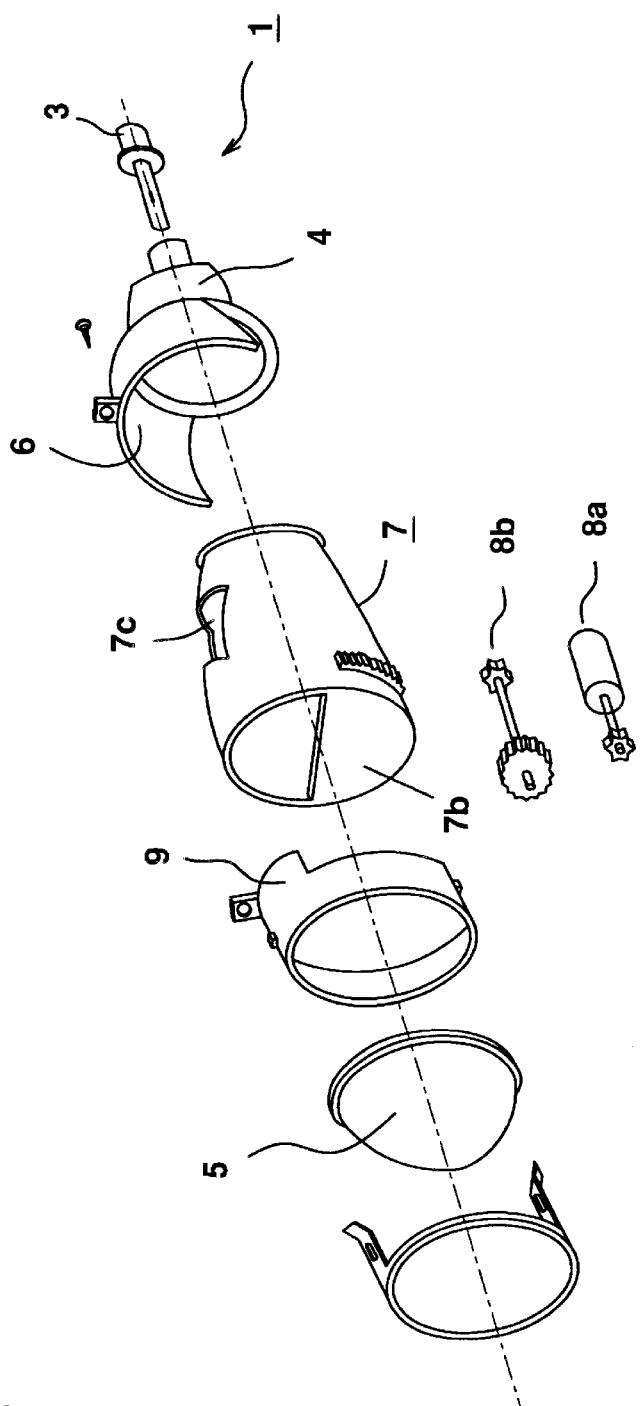
FIG. 5 is a perspective exploded view of the vehicle headlight of FIG. 4.

Hereinafter, preferred embodiments of the present invention will be described in detail with reference to the attached drawings. In FIGS. 4 and 5, the reference numeral 1 denotes a vehicle headlight according to a preferred embodiment of the present invention.

The vehicle headlight 1 can include a light source 3, a projection lens 5, a fixed reflecting surface part 4, a fixing part 2, and a movable part 7. The fixed reflecting surface part 4 can function as a part of a first ellipse group reflecting surface (i.e., an ellipse group reflecting surface such as a rotated elliptic surface). The fixed reflecting surface part 4 can include a first focus f1 and a second focus f2. The light source 3 is preferably arranged approximately on the first focus f1, while a focus of the projection lens 5 can be arranged in the vicinity of the second focus f2. The fixing part 2 can be made up of a second ellipse group reflecting surface 6 and a fixing member 9. The second ellipse group reflecting surface 6 can have a first focus and a second focus f2. The light source 3 is preferably arranged approximately on the first focus, while the second focus of the second ellipse group reflecting surface 6 is preferably arranged approximately on the focus f2 of the projection lens 5. A preferred embodiment of the vehicle headlight 1 is basically a projector-type headlight. The fixing member 9 may be fit on the second ellipse group reflecting surface 6 to make up the fixing part 2. The fixing member 9 has a function of simultaneously holding the movable part 7 together with the fixed reflecting surface part 4 of the first ellipse group reflecting surface so as to be rotatable about an axis, i.e., the center line Z of the vehicle headlight 1. It is preferred that the fixed reflecting surface part 4 of the first ellipse group reflecting surface and the second ellipse group reflecting surface 6 be connected with each other by providing a stepped portion for holding the movable part 7 in place. A protruded portion can be provided on the movable part 7, while a groove can be peripherally formed in the fixed reflecting surface part 4, allowing the fixed part 2 and the movable part 7 to be fitted to each other in a reliable manner. In the vehicle headlight 1 shown in FIG. 4, the fixing member 9 also has a function of holding the projection lens 5 in place. It is not necessary that the fixing member 9 always has both the function of holding the movable part 7 in place and the function of holding the projection lens 5 in place. For instance, a member for holding the movable part 7 in place and a member for holding the projection lens in place may be connected with each other at a boundary between them.

Figure 6:
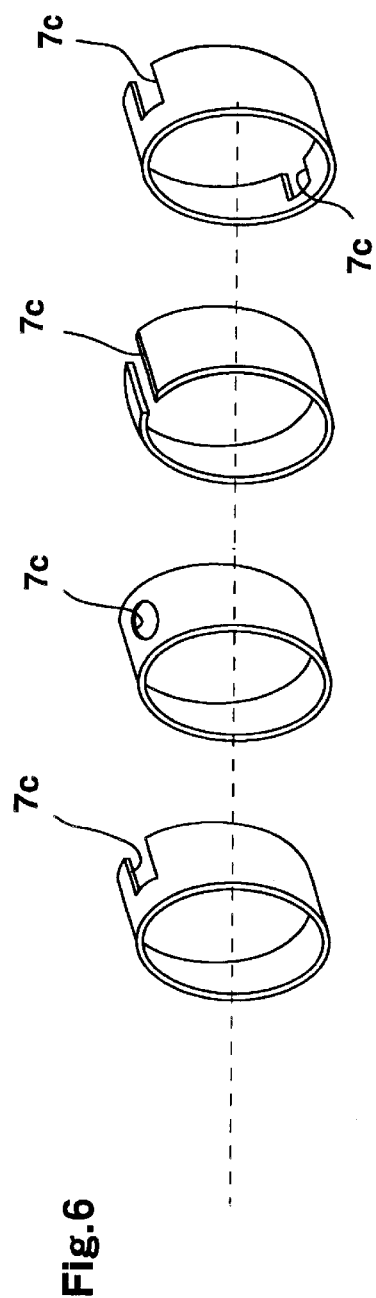
FIG. 6 is a perspective view showing a modified example of the shape of an opening part for an embodiment of a vehicle headlight made in accordance with the principles of the present invention.

The movable part 7 can include a movable reflecting surface part 7a that constitutes a part of the first ellipse group reflecting surface, a shutter part 7b for forming a desired light distribution pattern (for low beam), and an opening part 7c formed by cutting a part of the movable reflecting surface part 7a. The movable part 7 is preferably attached on the fixing part 2 such that it can be rotated around the center line Z of the vehicle headlight 1. If the vehicle headlight 1 is used for an illumination of high beam, the shutter part 7b may be omitted. In addition, the second ellipse group reflecting surface 6 can be positioned on the outside of the first ellipse group reflecting surface 4 and provided on a region that covers a moving range of the opening part 7c formed on the movable first ellipse group reflecting surface. In addition, the opening part 7c may be shaped as desired, for example as shown in FIG. 6.

Here, the fixed reflecting surface part 4 and the movable reflecting surface part 7a of the first ellipse group reflecting surface are formed by cutting one ellipse group reflecting surface, which is formed so as to have dimensions sufficiently satisfying the requirements in the vehicle headlight 1, in a plane perpendicular to the center line Z. Therefore, in a state that the fixed reflecting surface part 4 and the movable reflecting surface part 7a are combined together, such a combination acts on the light source 3 just as in the case with a single ellipse group reflecting surface, except there is an opening part 7c. Throughout the present invention, the term "ellipse group reflecting surface" can be defined as a curved surface having an ellipse or its similar shape as a whole, such as a rotated elliptic surface, a complex elliptic surface, an ellipsoidal surface, an elliptic cylindrical surface, an elliptical free-curved surface, or combination thereof. If a light source is located approximately on a first focus of the ellipse group reflecting surface, light rays emitted from the light source converge approximately to a second focus of the ellipse group reflecting surface.

The shutter part 7b and the second focus f2 of the first ellipse group reflecting surface that is made up of a combination of the fixed reflecting surface part 4 and the movable reflecting surface part 7a can be provided such that they can be located in the vicinity of the focus of the projection lens 5. In addition, the above combination of the movable reflecting surface part 7a and the fixed reflecting surface part 4 of the first ellipse group reflecting surface can be set to an initial position. When the vehicle headlight 1 is attached on the vehicle body 10 and the body does not lean (see FIG. 7(A)), the initial position allows the shutter part 7b to block off a portion of the reflecting light from the ellipse reflecting surface 4 to provide the horizontal bright-dark boundary Hh of light with respect to the road surface (see FIG. 7(D)). In this embodiment, furthermore, the upper end portion of the shutter part 7b extends straight. Alternatively, in fact, it may be shaped into one of other various forms so as to match the desired light distribution pattern. For example, if the vehicle headlight 1 is used as a lighting equipment for a four-wheeled vehicle to be driven on the left-hand side, the right half of the upper end portion of the shutter part 7b may include one side inclined downward at 15 degrees from the center of the upper end portion to the lower right direction so that the light distribution pattern includes an upper left portion inclined upward at 15 degrees in a state of viewing from the driver seat.

The opening part 7c can be formed in the movable part 7. In the embodiment of the present invention shown in FIG. 4, the opening part 7c is located at a position above the reflecting surface part 7a that is located at the initial position described above. On the other hand, the second ellipse group reflecting surface 6 can be provided on the fixing part 2 corresponding to the opening part 7c such that it generates reflecting light in a predetermined direction on the basis of the inclination of the vehicle body 10 as will be described later.

The movable part 7 can include a drive unit 8 including a motor 8a and a gear mechanism 8b which can be actuated according to signals from, for example, an inclination sensor (See FIG. 12) for detecting an inclination of the vehicle body. If the vehicle body 10 leans to one side, the movable part 7 can be rotated about the center line Z of the vehicle headlight 1.

Figure 7:
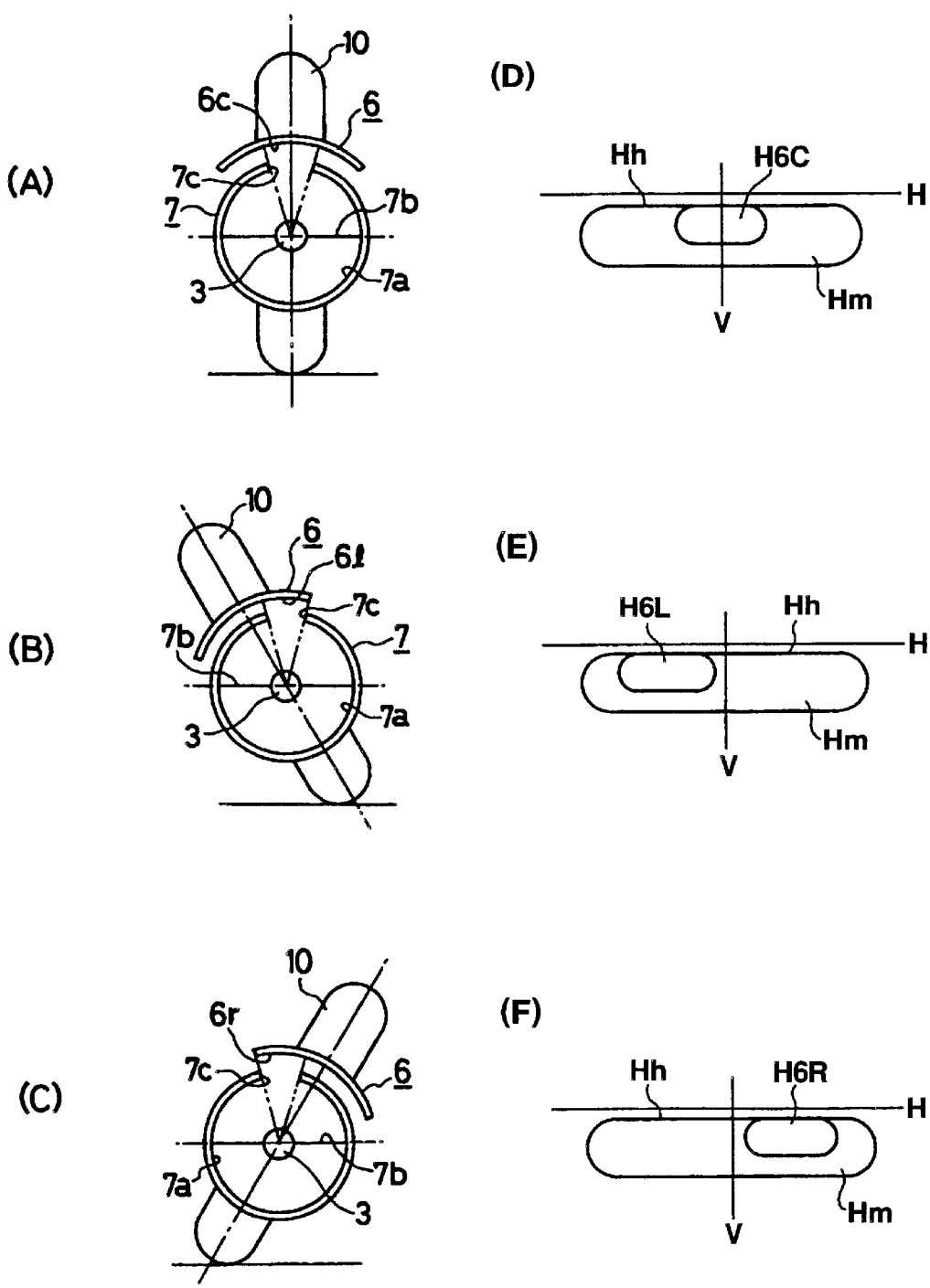
FIGS. 7(A)–(F) include views for illustrating the vehicle headlight of FIG. 4, including views 7(A)–(C) which include different explanatory drawings that illustrate the positional relationships between the first ellipse group reflecting surface and the second ellipse group reflecting surface on the basis of the inclinations of the vehicle body, respectively, and FIGS. (D)–(F) include different explanatory drawings that correspond to the respective drawings of FIGS. (A)–(C) in which each of the drawings indicates light distribution characteristics obtained from light reflected from the second ellipse group reflecting surface and light distribution characteristics obtained from the entire vehicle headlight.

FIGS. 7(A)–(C) schematically illustrate the movement of the movable part 7 responding to the inclination of the vehicle body 10. FIG. 7(A) shows the geometrical conditions when the vehicle body 10 goes straight. At this time, the vehicle body 10 is not inclined, so that the movable part 7 is in a state of initial position with respect to the fixing part 2. At this time, the opening part 7c is located on the center part 6c of the second ellipse group reflecting surface 6. Furthermore, in FIG. 7(A)–(C), the vehicle body 10, the movable part 7, the second ellipse group reflecting surface 6, and so on are represented as viewed from the driver seat.

In this embodiment of the present invention, when the vehicle goes straight, the vehicle headlight 1 illuminates the forward area ahead of the vehicle in the traveling direction. The middle portion 6c of the second ellipse group reflecting surface 6 can be configured such that the light source 3 is located substantially at a position corresponding to the first focus of the middle portion 6c. The middle portion 6c may be formed as a rotated elliptic surface or the like where the second focus can be located in the vicinity of the second focus f2 of the fixed reflecting surface part 4. The reflecting light from the middle portion 6c illuminates the forward area ahead of the vehicle body 10 with the horizontal bright-dark boundary Hh of light as indicated as an auxiliary light distribution H6C in FIG. 7(D), as is the case with the main light distribution Hm which is substantially rectangular and long in the horizontal direction, and is formed by the fixed reflecting surface part 4 of the first ellipse group reflecting surface and the reflecting surface part 7a and the shutter part 7b of the movable reflecting surface part 7.

FIG. 7(B) shows the vehicle body 10 turning to the left side. In this case, the vehicle body 10 leans to the left side in the traveling direction. Therefore, if the vehicle body 10 leans to one side, for example, the inclination of the vehicle can be detected by an inclination sensor (see FIG. 12) attached on the vehicle body, followed by actuating the drive unit 8 to turn the movable part 7 with respect to the fixing part 2. For instance, at the time of turning to the left side, the movable part 7 turns clockwise in the traveling direction, allowing the shutter part 7b to be located at a position where the horizontal bright-dark boundary Hh of light can be formed. Therefore, the main light distribution Hm formed by the fixed reflecting surface part 4 of the first ellipse group reflecting surface, and the movable reflecting surface part 7a and the shutter part 7b of the first ellipse group reflecting surface can be the same as one obtained at the time when the vehicle body goes straight as described above even when the vehicle body 10 leans to one side.

Here, considering the positional relationship between the opening part 7c and the second ellipse group reflecting surface 6, the fixing part 2 inclines as the vehicle body 10 leans to one side. The movable part 7 keeps its upright position through the actuation of the drive unit 8. Thus, the auxiliary reflecting surface 6 can be shifted with reference to the opening part 7c.

In this embodiment of the present invention, the light that passes through the opening part 7c when the vehicle body 10 is leaned to the left side reaches a left corresponding portion 61 of the second ellipse group reflecting surface 6. The reflected light from the left corresponding portion 61 can be illuminated intensively on a predetermined area, i.e., the left forward area ahead of the vehicle in the traveling direction. Therefore, the auxiliary light distribution H6L from the left corresponding portion 61 can be positioned on the left side with respect to the vertical center line V of the main light distribution Hm as shown in FIG. 7(E). That is, the forward area ahead of the vehicle body 10 in the traveling direction can be brightly illuminated.

FIG. 7(C) indicates a state of the vehicle body 10 turning to the right side. If the vehicle body 10 leans to the right side, the light that passes through the opening part 7c reaches a right corresponding portion 6r of the second ellipse group reflecting surface 6. The reflected light from the right corresponding portion 6r can be intensively illuminated on a predetermined area, i.e., the right forward area ahead of the vehicle in the traveling direction. Therefore, as shown in FIG. 7(F), the auxiliary light distribution H6R from the right corresponding portion 6r brightly illuminates the predetermined light area with respect to the vertical center axis V of the main light distribution Hm.

Furthermore, the middle portion 6c, the left corresponding portion 61, and the right corresponding portion 6r of the second ellipse group reflecting surface 6 may be formed as a single ellipse group reflecting surface, or alternatively they may be formed as a combination of a plurality of different ellipse group reflecting surfaces. Also, it is preferable that the illumination area constructed of the reflecting light from the second ellipse group reflecting surface 6 be gradually moved in conjunction with the movement of the movable part 7. Therefore, each structural element of the second ellipse group reflecting surface 6 is not limited to three components, i.e., the middle portion 6c, the left corresponding portion 61, and the right corresponding portion 6r. It can be constructed of an appropriate number of the components or a part of a continuous surface. If a plurality of the ellipse group reflecting surfaces are combined together, the boundary portion of each structural component of the second ellipse group reflecting surface 6 may preferably have the continuity which can be difficult to recognize in appearance.

According to this embodiment of the present invention, even though the vehicle can be a two-wheeled type or the like where the vehicle body 10 leans to one side at the time of turning around, the light distribution can always be kept in parallel with the surface of the road. In this case, a cutoff line of the light distribution does not incline even though the inclination of the vehicle body 10 is increased. Therefore, in addition to an advantage of the increase in visibility, the area ahead of the vehicle in the direction of turning, i.e., in the traveling direction, can be brightly illuminated by changing the positional relationship between the opening part 7c of the movable reflecting surface 7 and the second ellipse group reflecting surface 6, so that the visibility in the traveling direction can be further improved.

Figure 8A:
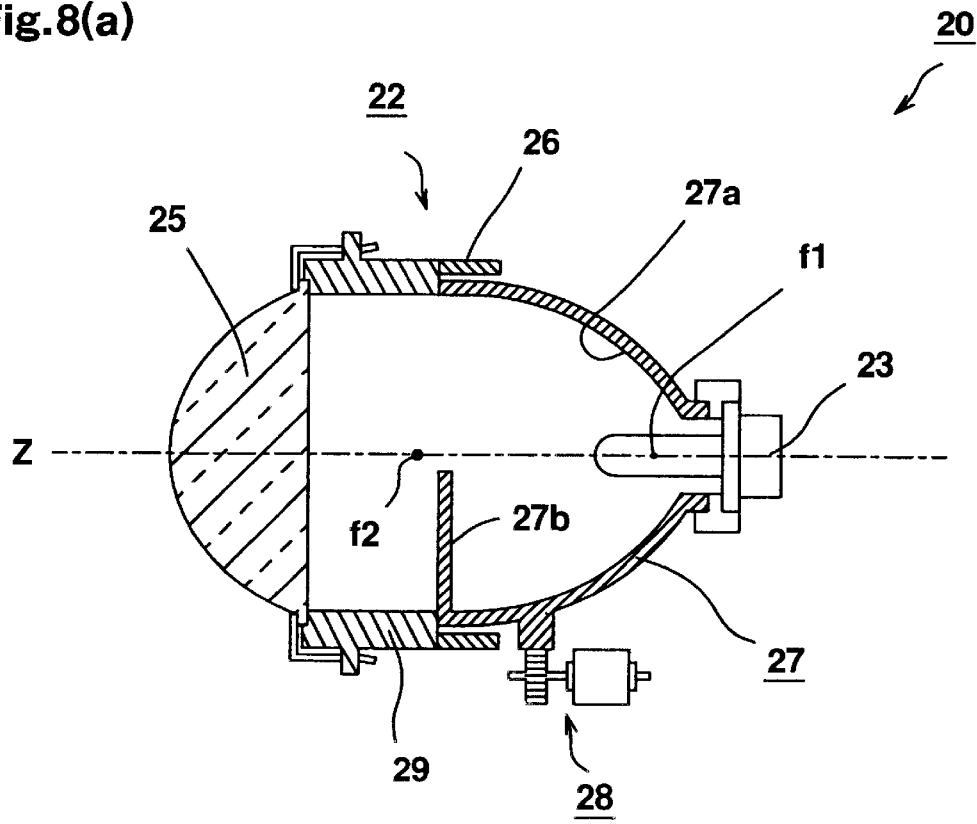
FIGS. 8(a)–(b) are a vertical cross sectional view taken along the optical axis Z of another preferred embodiment of a vehicle headlight made in accordance with the principles of the present invention, and a horizontal cross sectional view thereof, respectively.
Figure 8B:
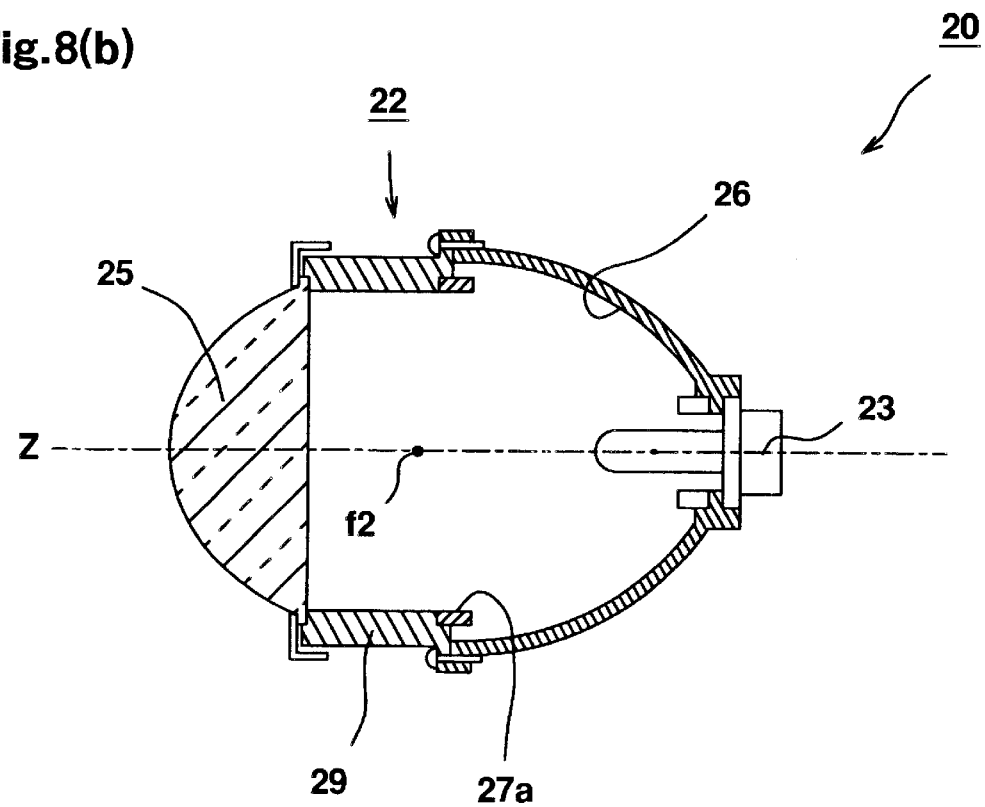
Figure 9:
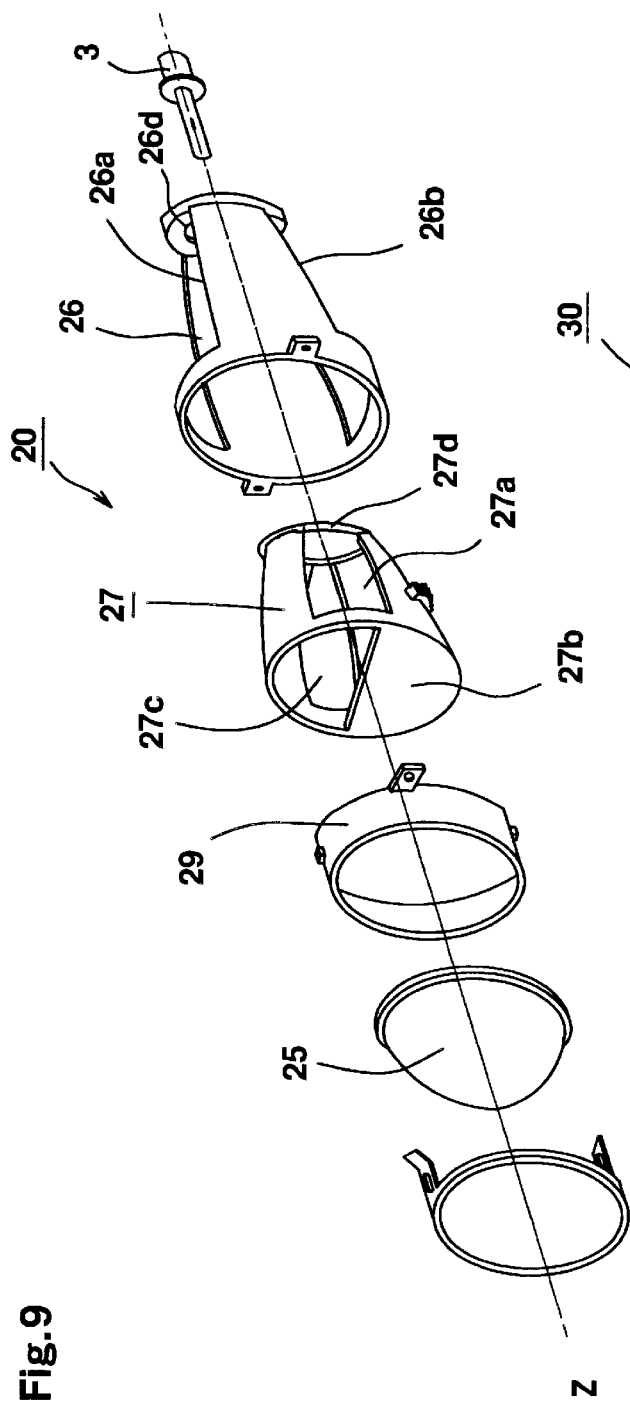
FIG. 9 is a perspective exploded view of the vehicle headlight of FIG. 8.

FIGS. 8(a)–(b) and FIG. 9 show a vehicle headlight 20 according to another embodiment of the present invention. The vehicle headlight 20 can include a light source 23, a projection lens 25, a first ellipse group reflecting surface 27 (also called movable part or movable reflecting surface 27), a second ellipse group reflecting surface 26, a shutter part 27b, a drive unit 28, and a fixing member 29. The first ellipse group reflecting surface 27 can include a first focus f1 on which the light source 23 is arranged in the vicinity thereof, and a second focus f2 which is located in the vicinity of the focus of the projection lens 25. The first ellipse group reflecting surface 27 can include the movable reflecting surface part 27a. The second ellipse group reflecting surface 26 is preferably located on the outside of the first ellipse group reflecting surface 27. The light source 23 can be arranged approximately on a first focus f1 of the second ellipse group reflecting surface 26, while a second focus f2 thereof can be arranged in the vicinity of the focus of the projection lens 25. The shutter portion 27b can be integrally formed with the movable reflecting surface part 27a of the first ellipse group reflecting surface 27. The drive unit 28 can be connected with the first ellipse group reflecting surface 27 to drive it. Here, the explanations about the same structural components as those in FIG. 4 will be omitted. It is noted that the vehicle headlight 20 of the present embodiment has an opening part 27c which can be located at different positions with respect to those of the vehicle headlight 1 of FIG. 4. In this embodiment, therefore, the configurations of the first ellipse group reflecting surface 27 and second ellipse group reflecting surfaces 26 are different from those of the embodiment shown in FIG. 4.

In the embodiment of FIG. 8, the vehicle headlight 20 can include a pair of opening parts 27c formed on both lateral sides of the first ellipse group reflecting surface 27. Also, the second ellipse group reflecting surface 26 can be arranged so as to extend over the movable range of the opening part 27c. In other words, therefore, there can be a pair of second ellipse group reflecting surfaces 26 formed in the vehicle headlight 20 so as to correspond to the pair of the opening parts 27c. In addition, the first ellipse group reflecting surface does not have to include a fixed reflecting surface part—it can be constructed only of the movable reflecting surface part 27a. In the vehicle headlight 20, the fixing part 22 preferably includes the second ellipse group reflecting surfaces 26 and the fixing member 29.

The movable reflecting surface part 27a can be integrally formed with the shutter part 27b and is able to rotate about the center line Z of the vehicle headlight 20 with reference to the fixing part 22 by actuating the drive unit 28.

The dimensions of the opening parts 27c of the movable part 27 can be appropriately defined on the basis of both the illumination area and the distribution of illumination intensity that is required for reflecting light from the second ellipse group reflecting surface 26 in a given circumstance. In FIG. 9, there is shown an exploded view of the vehicle lamp 20 in which the opening part 27c is formed as a comparatively large opening that includes a rim portion 27d. According to the present invention, however, the opening part 27c is not limited to such a form. Various forms will be allowed within the scope of the invention.

Furthermore, the second ellipse group reflecting surface 26 may be formed over the entire circumference. However, in view of weight saving, cost effectiveness, and so on, it is preferable to make it only on the required portion as shown in FIG. 9. In addition, the fixing member 29 can hold the movable part 27 in place such that the movable part 27 is interposed between the fixing member 29 and the second ellipse group reflecting surface 26 while allowing the rotation of the movable part 27 around the center line Z of the headlight 20. The fixing member 29 can be fixed on the peripheral portion of the second ellipse group reflecting surface 26 on the projection lens side by means of screws or the like in a state of pressing the rim portion 27d of the first ellipse group reflecting surface 27 against the peripheral portion 26d of the second ellipse group reflecting surface 26 on the light source side.

Figure 1:
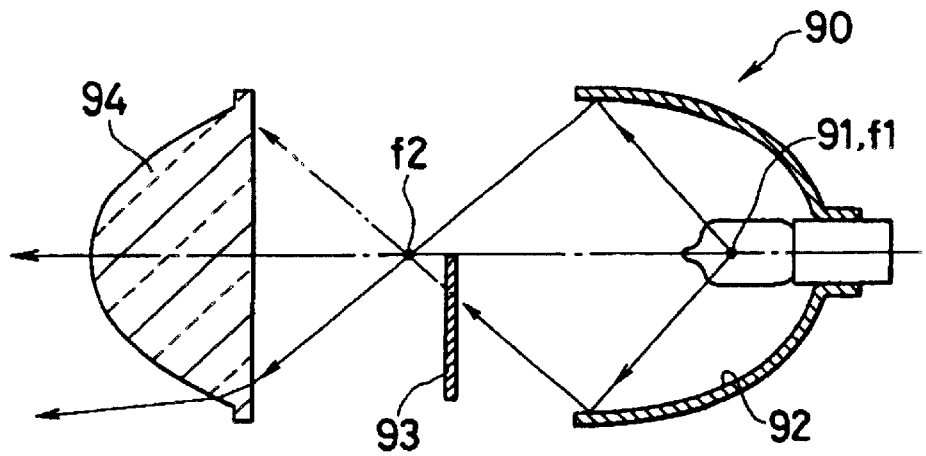
FIG. 1 is a cross sectional view illustrating a typical configuration of a conventional headlight.
Figure 2:
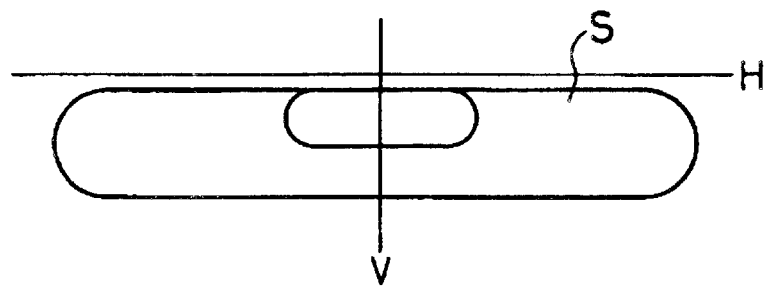
FIG. 2 is an explanatory view showing light distribution characteristics of the conventional vehicle headlight.
Figure 3:
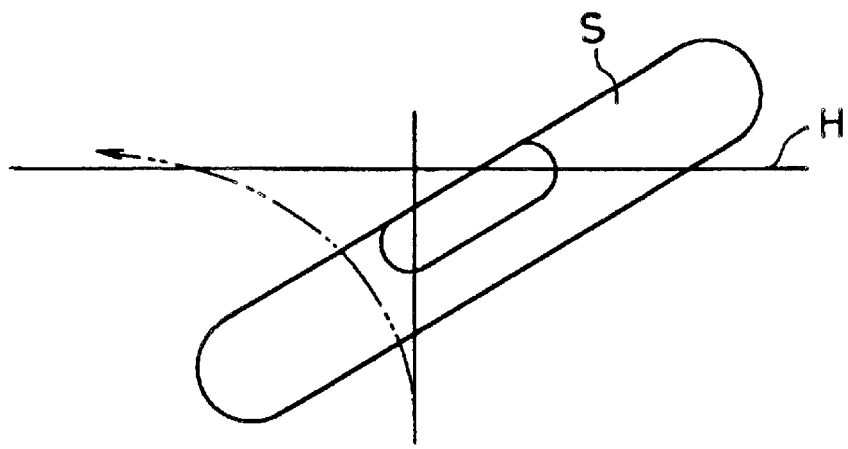
FIG. 3 is an explanatory view showing light distribution characteristics of the conventional vehicle lighting equipment, when the vehicle body leans to one side.
Figure 11:
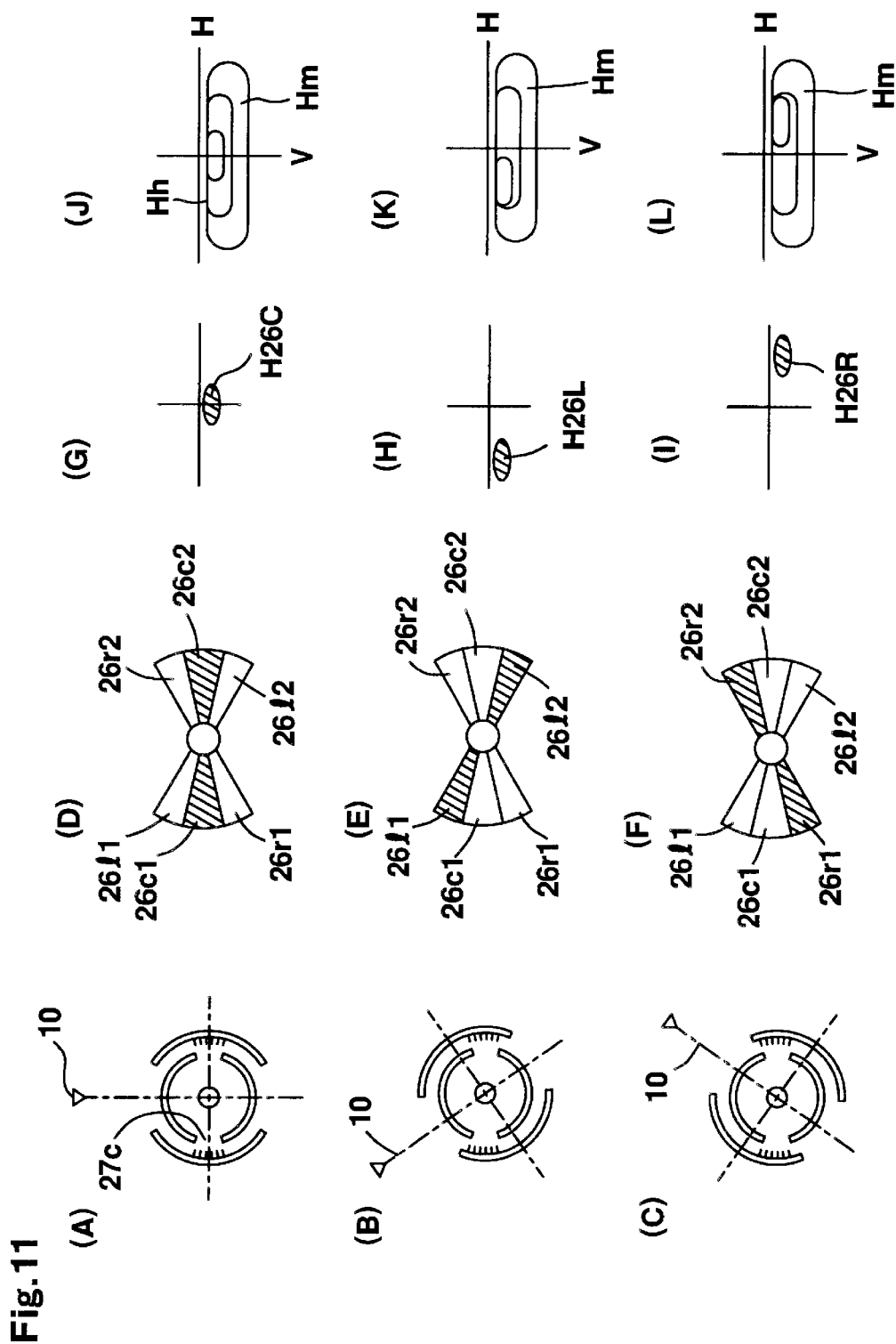
FIGS. 11(A)–(L) include views for illustrating the vehicle headlight of FIG. 8, where FIGS. 11(A)–(C) include different explanatory drawings that illustrate the positional relationships between the first ellipse group reflecting surface and the second ellipse group reflecting surface on the basis of the inclinations of the vehicle body, respectively, and FIGS. 11(D)–(F) include different explanatory drawings that correspond to the respective drawings of FIGS. (A)–(C) in which each of the drawings represents a reflecting area of the second ellipse group reflecting surface, FIGS. (G)–(I) indicate light distribution patterns obtained from light reflected from the second ellipse group reflecting surface, and FIGS. (J)–(L) indicate light distribution characteristics for the entire vehicle headlight.

FIGS. 11(A)–(L) schematically illustrate the motion of the movable part 27 when the vehicle body 10 leans to one side. In these figures, the vehicle body 10 is only represented as the direction of its vertical axis. FIGS. 1(A), (D), (G) and (J) show characteristics of the invention when the vehicle body 10 is going straight. In this case, as shown in FIG. 11(A), the vehicle body 10 is not inclined. Therefore, the movable part 27 is located at an initial position. As shown in FIG. 11(D), the opening parts 27c are located so as to face to the middle portions 6c1, 6c2 of the second ellipse group reflecting surface 26, respectively. Incidentally, in FIG. 11, the movable part 27, the second ellipse group reflecting surface 26, and so on are represented as viewed from the driver seat.

According to this embodiment of the present invention, when the vehicle body 10 goes straight, the vehicle headlight 20 may be configured such that the area ahead of the vehicle body 10 in the traveling direction can be illuminated brightly. Thus, the middle portions 26c1, 26c2 of the second ellipse group reflecting surface 26 can be formed as a rotated elliptic surface or the like having a first focus approximately on which the light source 23 is arranged and a second focus located in the vicinity of the focus f2 of the projection lens 25. Therefore, the light reflected from each of the middle portions 26c1, 26c2 illuminates the front area ahead of the vehicle body 10 with the horizontal bright-dark boundary Hh of light as indicated as an auxiliary light distribution H26C in FIG. 11(G), as is the case with the main light distribution Hm formed by the movable reflecting surface part 27a and the shutter part 27b of the first ellipse group reflecting surface 27.

FIG. 11(B) shows the vehicle body 10 turning to the left side. In this case, the vehicle body 10 leans to the left side in the traveling direction. Therefore, the drive unit 28 is actuated to turn the movable part 27 with reference to the fixing part 22. For example, at the time of turning to the left side, the movable part 27 turns clockwise in the traveling direction, allowing the shutter part 27b to be located at a position where the horizontal bright-dark boundary Hh of light can be formed. Therefore, the main light distribution Hm formed by the movable reflecting surface part 27a and the shutter part 27b of the first ellipse group reflecting surface 27 can be the same as one obtained at the time when the vehicle body 10 goes straight, as described above, even when the vehicle body 10 leans to one side.

Here, considering the positional relationship between the opening part 27c and the second ellipse group reflecting surface 26, the fixing part 22 inclines as the vehicle body 10 leans to one side. At this time, the movable part 27 can keep its upright position through the actuation of the drive unit 28. Thus, the opening parts 27c faces to the upper left portion 26l1 and lower right portion 26l2 (which are referred to as left-corresponding portion or 26l) of the second ellipse group reflecting surface 26.

In this embodiment of the present invention, the light reflected from the left-corresponding portion 26l1 and 26l2 of the second ellipse group reflecting surface 26 which passes through the opening parts 27c at the time of leaning to the left side can be intensively illuminated on a predetermined area, i.e., the left forward area ahead of the vehicle in the traveling direction. Therefore, the auxiliary light distribution H26L from the left-corresponding portion 26l can be positioned on the left side with respect to the vertical center line V of the main light distribution Hm as shown in FIG. 11(H). That is, the forward area ahead of the vehicle body 10 in the traveling direction can be brightly illuminated.

FIG. 11(C) indicates a state of the vehicle body 10 turning to the right side. If the vehicle body 10 leans to the right side by the same action as one described above, as shown in FIG. 11(F), the light that passes through the opening parts 27c reaches each of right corresponding portions 26r1, 26r2 of the second ellipse group reflecting surface 26. Here, the right corresponding portion 26r1 can include a lower left portion of the second ellipse group reflecting surface 26, while the right corresponding portion 26r2 can include an upper right portion thereof. The reflected light from the right corresponding portions 26r1, 26r2 can be illuminated intensively on the predetermined area H26R, i.e., the right forward area ahead of the vehicle in the traveling direction. Therefore, as shown in FIGS. 11(I) and 11(L), the auxiliary light distribution H26R from the right corresponding portion 26r can be positioned on the right side with respect to the vertical center line V of the main light distribution Hm, and thus, the forward and rightward area ahead of the vehicle body in the traveling direction can be brightly illuminated.

According to the vehicle headlight 20 of the present embodiment, even though the vehicle is a two-wheeled, multi-wheeled, or the like where the vehicle body 10 leans to one side at the time of turning, the light distribution can always be kept in parallel with the surface of the road. In this case, a cutoff line of the light distribution does not incline even though the inclination of the vehicle body 10 is increased. Therefore, in addition to an advantage of the increase in visibility, the area ahead of the vehicle in the direction of turning, i.e., in the traveling direction can be illuminated brightly by changing the positional relationship between the opening part 27c of the movable reflecting surface 27 and the second ellipse group reflecting surface 26, so that the visibility in the traveling direction can be further improved.

Furthermore, for the area on which the second ellipse group reflecting surface 26 is formed, it may cover the movable range of the opening part 27c. It is preferable that the second ellipse group reflecting surface 26 is formed on an appropriate area which is wider than the movable range of the opening part 27c for capturing the light that passes through the opening part 27c onto the second ellipse group reflecting surface 26 even though the relative moving distance of the movable part 27 with respect to the fixing part 22 is large.

Furthermore, the upper edge 26a and the lower edge 26b of the second ellipse group reflecting surface 26 may be adjusted on the basis of the light distribution characteristics required for the light reflected from the second ellipse group reflecting surface 26 and may be defined in consideration of the length and width in the optical axis Z direction of the second ellipse group reflecting surface 26, the state of the inclination of the vehicle on which the headlight or lamp is to be mounted (for example, the angle), and so on.

Figure 10:
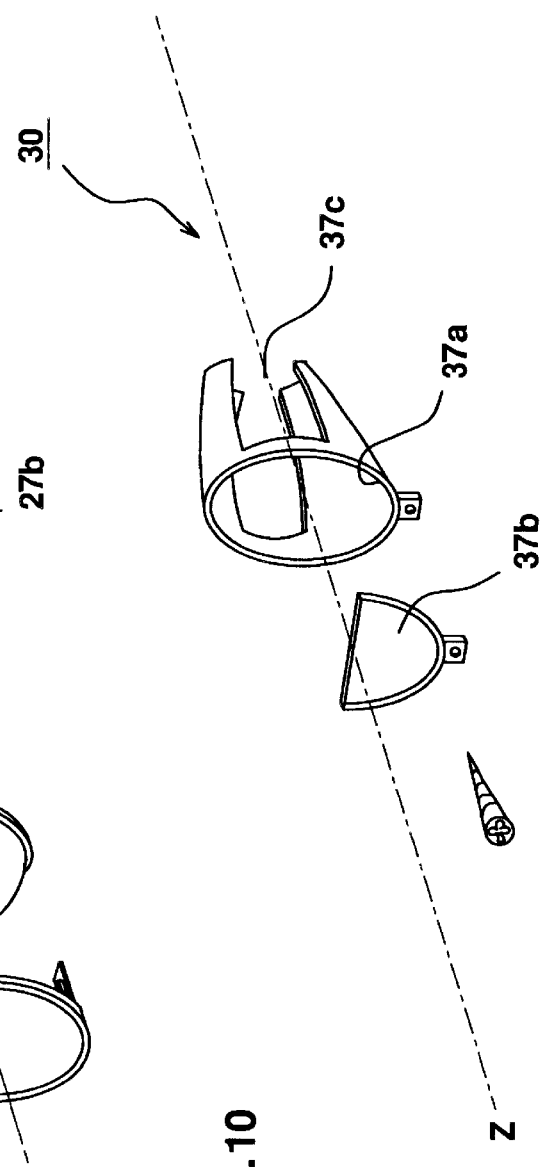
FIG. 10 is a perspective view of a modified example of a movable part equipped in the vehicle headlight of FIG. 8.

FIG. 10 illustrates a modified example 30 of the movable part 27 of the vehicle headlight 20. If a larger opening part 37c is formed in the example 30 of the movable part, as shown in FIG. 10, the rim portion 27d, which is a portion to be pressed against the peripheral portion 26d of the second ellipse group reflecting surface on the light source side may be modified to prevent it from being deformed by impact or the like. If there is no fear of deformation or the like, as shown in FIG. 10, the rim portion 27d may be omitted. Furthermore, the shutter part 37b and the movable reflecting surface part 37a may be integrally formed, or alternatively they may be separately formed and then fixed together with screws or the like.

During actual operation of a vehicle, such as a two-wheeled vehicle, the vehicle can sometimes be turned around using its handle bars at the time of traveling at a low speed such that the inclination of the vehicle body 10 can be negligible. On the other hand, when the vehicle runs at a high speed, it can be difficult to turn the vehicle around using its handle bars—instead the driver may incline the vehicle body 10 to one side to perform the turn. The degree of inclining the vehicle body 10 can depend on the traveling speed of the vehicle. In the present invention, therefore, it is preferable to adopt output signals to be obtained from a steering angle sensor of the steering device, such as a handle bar, a sensor for detecting the traveling speed of the vehicle, and so on in addition to the output of the inclination sensor described above as signals to be entered into the drive unit.

Figure 12:
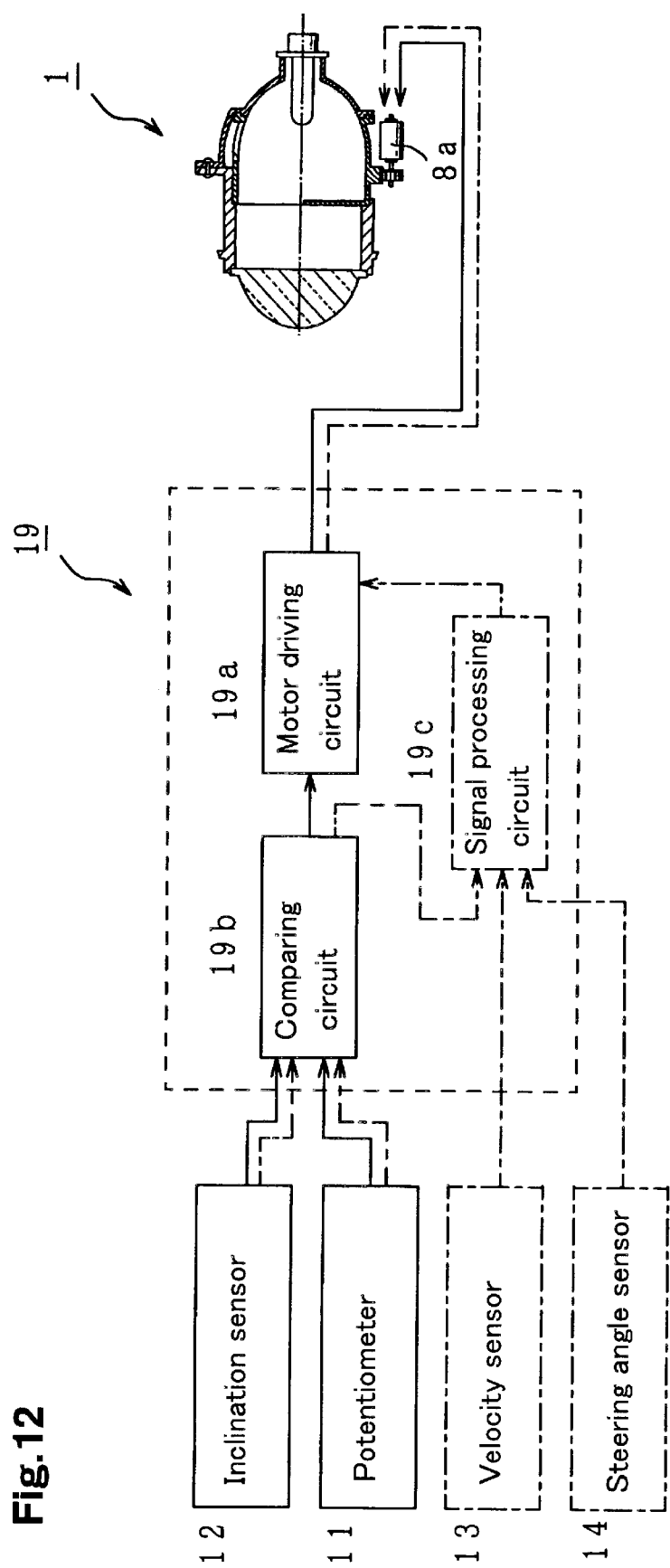
FIG. 12 illustrates a block diagram of control circuits for driving a motor of the vehicle headlight of FIG. 4.

FIG. 12 illustrates a block diagram showing control circuit 19 of the motor 8a. In FIG. 12, a route indicated by solid lines shows a case in which motor 8a is driven by output from an inclination sensor 12 for detecting inclination of the vehicle body 10. A route indicated by dot-dash lines, shows a case in which the outputs that control/drive motor 8a includes output from a velocity sensor 13 for detecting running speed of the vehicle body 10, and output from a steering angle sensor 14 for detecting a steering angle of a steering device, such as a handle bar, or steering wheel of the vehicle body 10.

First, the structure of the control circuit 19 when driving the motor 8a is controlled by output from the inclination sensor 12 will now be described (solid line route).

Figure 13:
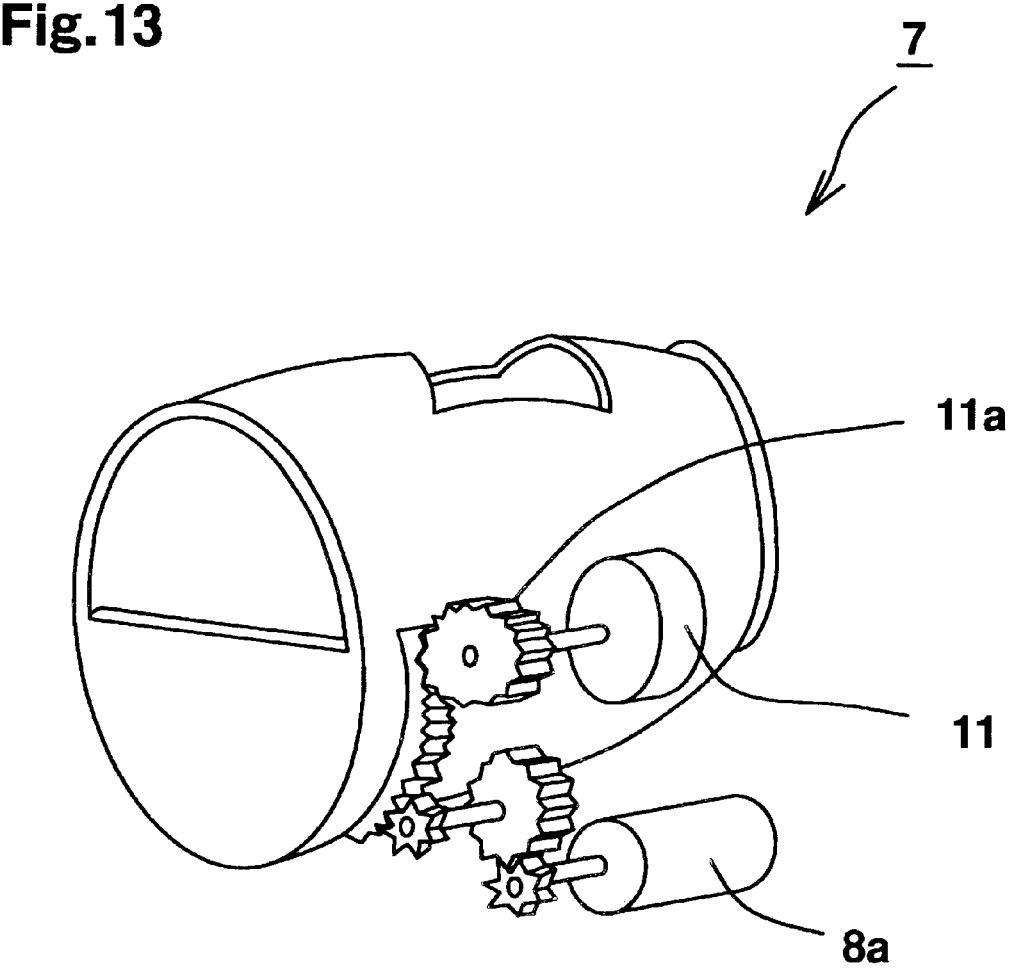
FIG. 13 illustrates a partial perspective view of the vehicle headlight of FIG. 4 showing a movable part of the vehicle headlight to which a potentiometer is attached.

The control circuit 19 can include a motor driving circuit 19a and a comparing circuit 19b. An output terminal of the motor driving circuit 19a can be connected to the motor 8a. The motor driving circuit 19a can be actuated based upon input from the comparing circuit 19b. The comparing circuit 19b can have an input terminal connected to an output terminal of the inclination sensor 12, and an input terminal connected to an output terminal of a potentiometer 11. The potentiometer 11 is preferably attached to the movable part 7 by a wheel 11a engaged with a gear of the movable part 7, as shown in FIG. 13. The location on which the potentiometer 11 is attached can be basically any portion of the movable part 7. However, considering mass-production efficiency, it is preferable that the potentiometer 11 be located at an end portion of a gear of the movable part 7 that also engages a wheel mechanism connected to the motor 8a.

Signal processing in the comparing circuit 19b will now be described. The comparing circuit 19b functions to compare a terminal voltage of the potentiometer 11, i.e., a signal showing inclination of the vehicle headlight 1, and a reference voltage, i.e., a voltage from the inclination sensor. When there is any difference therebetween, the comparing circuit 19b generates a driving signal for driving the motor 8a depending on the difference. The driving signal is directly outputted to the motor driving circuit 19a. Then, the motor 8a is actuated, and the movable part 7 is rotated around the center line Z of the vehicle headlight 1. When there is no difference between the output from the inclination sensor 12 and the output from the potentiometer 11, no driving signal is provided to the motor driving circuit 19a.

Second, the structure of the control circuit 19 for the case when the outputs used to control the motor 8a includes, in addition to output from the inclination sensor 12, output from a velocity sensor 13 for detecting running speed of the vehicle body, and a steering angle sensor 14 for detecting a steering angle of a handle bar, a steering wheel, or other steering mechanism or device of the vehicle body 10 (the route indicated by dot-dash lines). Either one of the velocity sensor 13 and the steering angle sensor 14 is not necessarily included, but may be included if required or desired.

The control circuit 19 can include a motor driving circuit 19a, a comparing circuit 19b, and a signal processing circuit 19c. The signal processing circuit 19c is preferably arranged between the comparing circuit 19b and the motor driving circuit 19a. The comparing circuit 19b can have an input terminal connected to an output terminal of the inclination sensor 12, and an input terminal connected to an output terminal of the potentiometer 11. An output terminal of the comparing circuit 19b can be connected to an input terminal of the signal processing circuit 19c. Operation of the comparing circuit 19b can be the same as described above, except that the driving signal generated as a result of voltage comparison in the comparing circuit 19b is outputted to an input terminal of the signal processing circuit 19c. The motor driving circuit 19a can include an input terminal connected to an output terminal of the signal processing circuit 19c, and an output terminal connected to the motor 8a. The motor driving circuit 19a actuates the motor 8a depending on the driving signal outputted from the signal processing circuit 19c.

Regarding operation of the control circuit 19, the signal processing circuit 19c functions to appropriately adjust or compensate inputted signals from the comparing circuit 19b. For example, when velocity output from the velocity sensor 13 is smaller than 5 [km/h], i.e., when a driver walks carrying a motorbike, even though there is any difference as a result of comparison in the comparing circuit 19b, the motor driving circuit 19a is not actuated. In another example, when the vehicle runs at a relatively low speed, a signal from the steering angle sensor 14 may be processed with priority, and the outputs from the comparing circuit 19b and the velocity sensor 13 may be used to adjust or correct the amount of movement for the motor 8a calculated based upon the output from the steering angle sensor 14. And when the vehicle runs at a middle or high speed, the output from the comparing circuit 19b may be processed with greater priority than an output from the steering angle sensor 14.

As another modified example of the control circuit 19, although not shown, the velocity sensor 13 can be located at input sides of the inclination sensor 12 and the potentiometer 11. In this case, it is possible that the inclination sensor 12 and the potentiometer 11 are not actuated when the detected velocity is smaller than 5 [km/h].

Regarding sensors, FIG. 12 shows an example in which only the inclination sensor 12 is referenced, and another example that the three kinds of sensors, i.e., the inclination sensor 12, the velocity sensor 13, the steering angle sensor 14, are referenced. The kinds and numbers of sensors are not limited thereto. Either one of the three sensors can be solely used, or either two of the three sensors can be used in combination. Alternatively, any other kind(s) of sensor(s) can be used solely or in combination with the above three kinds of sensors to control the motor 8a with respect to a particular driving condition or preference.

Operational advantages of the present invention will now be described. First, the vehicle lamp of the present invention includes preferred embodiments shown as headlights 1 and 20, which can provide a light distribution pattern whose horizontal line or curve is kept to be substantially parallel to the surface of the earth at any time of operation of the vehicle headlights 1 and 20. This advantage is emphasized when the vehicle headlights 1 and 20 are mounted on two-wheeled or three-wheeled vehicles, because inclination of the vehicle body is significant. Second, the structure of the vehicle light 1 and 20 in which the movable part 7 and 27 are rotatably retained between the fixing member 9 and 29 and the second reflecting surface 6 and 26, respectively, enables a simple mechanism for driving the movable part 7 and 27 of the vehicle light 1 and 20. The simple mechanism has advantages in mass-production for efficiency and cost.

While there has been described what are at present are considered to be preferred embodiments of the present invention, it will be understood that various modifications may be made thereto, and it is intended that the appended claims cover all such modifications and other embodiments as fall within the true spirit and scope of the invention.

What is claimed is:

1. A vehicle lamp for use on a vehicle, comprising:

a light source;

a projection lens;

a first ellipse group reflecting surface having a movable part provided at at least one portion thereof, said first ellipse group reflecting surface having a first focus located approximately at the light source, the first ellipse group reflecting surface being configured such that light rays traveling from the first ellipse group reflecting surface can enter the projection lens, said movable part having at least one opening;

a second ellipse group reflecting surface corresponding to an area adjacent a moving range of the opening formed in the movable part of the first ellipse group reflecting surface, said second ellipse group reflecting surface having a first focus located approximately at the light source, the second ellipse group reflecting surface being configured such that light rays traveling from the second ellipse group reflecting surface can enter the projection lens;

a drive unit connected with the movable part of the first ellipse group reflecting surface; and a fixing member arranged such that the movable part of the first ellipse group reflecting surface is located adjacent the fixing member and the second ellipse group reflecting surface, the fixing member retaining the movable part of the first ellipse group reflecting surface in place, wherein a shape of light distribution formed by light rays from the projection lens has a long side extending in a substantially horizontal direction, the movable part of the first ellipse group reflecting surface is configured to turn by actuating the drive unit such that the long side of the shape of the light distribution is kept substantially in the horizontal direction, and light rays that pass through the opening of the first ellipse group reflecting surface are reflected from at least a part of the second ellipse group reflecting surface, and converge into a predetermined direction to illuminate an area ahead of the vehicle.

2. The vehicle lamp according to claim 1, further comprising:

a shutter part configured to work together with the movable part of the first ellipse group reflecting surface, wherein the movable part of the first ellipse group reflecting surface turns by actuating the drive unit such that an upper end of the shutter part is kept in a position coinciding with the horizontal direction.

3. The vehicle lamp according to claim 2, wherein the shutter part and the movable part of the first ellipse group reflecting surface are integrally formed.

4. The vehicle lamp according to any one of claims 1 and 2, wherein the light rays that pass through the opening and reflect on the second ellipse group reflecting surface illuminates a forward area in a traveling direction when the vehicle leans to one side.

5. The vehicle lamp according to any one of claims 1 and 2, wherein a second focus of the second ellipse group reflecting surface is located in the vicinity of a focus of the projection lens.

6. The vehicle lamp according to any one of claims 1 and 2, wherein the first ellipse group reflecting surface has a fixing part, and a portion of the second ellipse group reflecting surface for covering the opening is connected with the fixing part of the first ellipse group reflecting surface through a stepped portion.

7. The vehicle lamp according to any one of claims 1 and 2, wherein the first ellipse group reflecting surface has a fixing part adjacent the movable part, and the fixing part and the movable part of the first ellipse group reflecting surface function as a continuous surface.

8. The vehicle lamp according to any one of claims 1 and 2 wherein the first ellipse group reflecting surface is located inside the second ellipse group reflecting surface.

9. The vehicle lamp according to any one of claims 1 and 2, further comprising:

a sensor for detecting a steering angle of a steering device, wherein turning of the first ellipse group reflecting surface is performed by the drive unit based on an output of the sensor for detecting a steering angle of a steering device.

10. The vehicle lamp according to any one of claims 1 and 2, wherein the drive unit includes a motor and a gear mechanism.

11. The vehicle lamp according to any one of claims 1 and 2, wherein the shape of the light distribution is generally rectangular.

12. The vehicle lamp according to claim 1, further comprising:

a sensor for detecting inclination of the vehicle, wherein turning of the first ellipse group reflecting surface is performed by the drive unit based on an output of the sensor for detecting inclination of the vehicle.

13. The vehicle lamp according to any one of claims 1, 2 and 12, further comprising:

a sensor for detecting a running speed of the vehicle, wherein turning of the first ellipse group reflecting surface is performed by the drive unit based on an output of the sensor for detecting a running speed of the vehicle.

14. The vehicle lamp according to claim 13, further comprising:

a sensor for detecting a steering angle of a steering device, wherein turning of the first ellipse group reflecting surface is performed by the drive unit based on an output of the sensor for detecting a steering angle of a steering device.

15. A vehicle lamp for mounting on a vehicle, comprising:

a light source;

a projection lens;

a fixed first ellipse group reflecting surface having a first focus located substantially on a position of the light source, the fixed first ellipse group reflecting surface being configured such that light rays traveling from the fixed first ellipse group reflecting surface are adjusted to enter the projection lens;

a movable second ellipse group reflecting surface having a first focus and at least one opening, the first focus being located substantially at a position of the light source, the movable second ellipse group reflecting surface being configured such that light rays traveling from the movable second ellipse group reflecting surface are adjusted to enter the projection lens;

a fixed third ellipse group reflecting surface having a first focus located substantially on a position of the light source, the fixed third ellipse group reflecting surface being configured such that light rays traveling from the fixed third ellipse group reflecting surface are adjusted to enter the projection lens, the fixed third ellipse group reflecting surface being connected with the first ellipse group reflecting surface, the fixed third ellipse group reflecting surface being formed so as to correspond to an area adjacent a moving range of the opening formed in the movable second ellipse group reflecting surface;

a drive unit connected with the movable second ellipse group reflecting surface;

a fixing member arranged such that the movable second ellipse group reflecting surface is located between the fixing member, and the first ellipse group reflecting surface and the third ellipse group reflecting surface, the fixing member retaining the movable second ellipse group reflecting surface in place, wherein a shape of light distribution formed by light rays from the projection lens has a long side extending in a substantially horizontal direction, the movable second ellipse group reflecting surface turns by actuating the drive unit such that the long side of the shape of the light distribution is kept in the substantially horizontal direction, and light rays that pass through the opening of the second ellipse group reflecting surface are reflected from the third ellipse group reflecting surface, and converge into a predetermined direction to illuminate an area ahead of the vehicle.

16. The vehicle lamp according to claim 15, further comprising:

a shutter part which is capable of working together with the second ellipse group reflecting surface, wherein the second ellipse group reflecting surface turns by actuating the drive unit such that an upper end of the shutter part is kept in a substantially horizontal position.

17. The vehicle lamp according to claim 16, wherein the second ellipse group reflecting surface and the shutter part are integrally formed.

18. The vehicle lamp according to any one of claims 15 and 16, wherein the light rays that pass through the opening and are reflected on the third ellipse group reflecting surface illuminate a forward area in a traveling direction when the vehicle leans to one side.

19. The vehicle lamp according to any one of claims 15 and 16, wherein a second focus of the third ellipse group reflecting surface is located in the vicinity of a focus of the projection lens.

20. The vehicle lamp according to any one of claims 15 and 16, wherein the first ellipse group reflecting surface is connected with the third ellipse group reflecting surface through a stepped portion.

21. The vehicle lamp according to any one of claims 15 and 16, wherein the first ellipse group reflecting surface and the second ellipse group reflecting surface function as a continuous surface.

22. The vehicle lamp according to any one of claims 15 and 16, wherein the second ellipse group reflecting surface is located inside the third ellipse group reflecting surface.

23. The vehicle lamp according to any one of claims 15 and 16, further comprising:

a sensor for detecting a steering angle of a steering device, wherein turning of the movable second ellipse group reflecting surface is performed by the drive unit based on an output of the sensor for detecting a steering angle of a steering device.

24. The vehicle lamp according to any one of claims 15 and 16, wherein the drive unit includes a motor and a gear mechanism.

25. The vehicle lamp according to any one of claims 15 and 16, wherein the shape of light distribution is generally rectangular.

26. The vehicle lamp according to claim 15, further comprising:

a sensor for detecting inclination of the vehicle, wherein turning of the second ellipse group reflecting surface is performed by the drive unit based on an output of the sensor for detecting inclination of the vehicle.

27. The vehicle lamp according to any one of claims 15, 16 and 26, further comprising:

a sensor for detecting a running speed of the vehicle, wherein turning of the movable second ellipse group reflecting surface is performed by the drive unit based on an output of the sensor for detecting a running speed of the vehicle.

28. The vehicle lamp according to claim 27, further comprising:

a sensor for detecting a steering angle of a steering device, wherein turning of the movable second ellipse group reflecting surface is performed by the drive unit based on an output of the sensor for detecting a steering angle of a steering device.

29. A vehicle lamp for use on a vehicle, comprising:

a light source;

a projection lens;

a movable first ellipse group reflecting surface having a first focus and a pair of openings, the first focus being located approximately at a position of the light source, the movable first ellipse group reflecting surface being configured such that light rays traveling from the movable first ellipse group reflecting surface can enter the projection lens;

a fixed second ellipse group reflecting surface having a first focus located approximately at a position of the light source, the fixed second ellipse group reflecting surface being configured such that light rays traveling from the fixed second ellipse group reflecting surface can enter the projection lens, the fixed second ellipse group reflecting surface being formed so as to correspond to an area adjacent a moving range of one of the openings formed in the movable first ellipse group reflecting surface;

a drive unit connected with the movable first ellipse group reflecting surface; and a fixing member arranged such that the movable first ellipse group reflecting surface is located adjacent the fixing member and the fixed second ellipse group reflecting surface, the fixing member retaining the movable first ellipse group reflecting surface in place, wherein a shape of light distribution formed by light rays from the projection lens has a long side extending in a substantially horizontal direction, the movable first ellipse group reflecting surface turns by actuating the drive unit such that the long side of the shape of the light distribution is kept in the substantially horizontal direction, and light rays that pass through at least one of the opening parts of the movable first ellipse group reflecting surface are reflected from the fixed second ellipse group reflecting surface, and converge into a predetermined direction to illuminate an area ahead of the vehicle.

30. The vehicle lamp according to claim 29, further comprising:

a shutter part which is capable of working together with the movable first ellipse group reflecting surface, wherein the movable first ellipse group reflecting surface turns by actuating the drive unit such that an upper end of the shutter part is kept in the substantially horizontal direction.

31. The vehicle lamp according to claim 30, wherein the movable first ellipse group reflecting surface and the shutter part are integrally formed.

32. The vehicle lamp according to any one of claims 29 and 30, wherein the light rays that pass through one of the opening parts are reflected on the fixed second ellipse group reflecting surface and illuminate a forward area in a traveling direction when the vehicle leans to one side.

33. The vehicle lamp according to any one of claims 29 and 30, wherein a second focus of the fixed second ellipse group reflecting surface is located in the vicinity of a focus of the projection lens.

34. The vehicle lamp according to any one of claims 29 and 30, wherein the movable first ellipse group reflecting surface is located inside the fixed second ellipse group reflecting surface.

35. The vehicle lamp according to claim 34, further comprising:

a sensor for detecting a running speed of the vehicle, wherein turning of the movable first ellipse group reflecting surface is performed by the drive unit based on an output of the sensor for detecting a running speed of the vehicle.

36. The vehicle lamp according to claim 35, further comprising:

a sensor for detecting a steering angle of a steering device, wherein turning of the movable second ellipse group reflecting surface is performed by the drive unit based on an output of the sensor for detecting a steering angle of a steering device.

37. The vehicle lamp according to any one of claims 29 and 30, further comprising:

a sensor for detecting a steering angle of a steering device, wherein turning of the movable second ellipse group reflecting surface is performed by the drive unit based on an output of the sensor for detecting a steering angle of a steering device.

38. The vehicle lamp according to any one of claims 29 and 30, wherein the drive unit includes a motor and a gear mechanism.

39. The vehicle lamp according to any one of claims 29 and 30, wherein the shape of light distribution is generally rectangular.

40. The vehicle lamp according to any one of claims 29 and 30, wherein the openings in the movable first ellipse group reflecting surface are located on lateral sides of the first ellipse group reflecting surface.

41. The vehicle lamp according to claim 29, further comprising:

a sensor for detecting inclination of the vehicle, wherein turning of the movable first ellipse reflecting surface is performed by the drive unit based on an output of the sensor for detecting inclination of the vehicle.

* * * * *